United States Patent Office 3,365,282
Patented Jan. 23, 1968

3,365,282
PROCESS FOR PREPARING AMINO DERIVATIVES OF POLYHEDRAL BORON COMPOUNDS
Maynard S. Raasch, Wilmington, Del., assignor to E. I. du Pont de Nemours and Company, Wilmington, Del., a corporation of Delaware
No Drawing. Filed Oct. 30, 1962, Ser. No. 234,258
10 Claims. (Cl. 23—358)

This invention relates to a process for making amino polyboron compounds. More specifically, it relates to a process for placing amino substituents on the polyhedral borane anions $B_{10}H_{10}^=$, $B_{12}H_{12}^=$ and their derivatives.

Compounds containing the polyhedral borane, or polyborate, anions $B_{10}H_{10}^=$ and $B_{12}H_{12}^=$ and derivatives of them have recently been reported. (Knoth et al., J. Am. Chem. Soc. 84, 1056 (1962). An exceedingly wide variety of derivatives of these anions can be made by substitution reactions in which one or more hydrogens bonded to boron are replaced by other groups.

Because of the many desirable properties of compounds containing amino groups, the amino derivatives of the new polyborate anions are useful in a number of fields. However, the known methods for making such amino compounds involve hazardous reagents or require two or more steps.

A process has now been discovered for preparing compounds containing amino derivatives of $B_{10}$ and $B_{12}$ polyhedral borane anions that proceeds in one step under relatively moderate conditions and does not require hazardous reagents. The process comprises reacting a compound containing a $B_mH_m^=$ anion where $m$ is 10 or 12 (i.e., decahydrodecaborate, $B_{10}H_{10}^=$, or dodecahydrododecaborate, $B_{12}H_{12}^=$) or a substituted derivative of either that contains at least one hydrogen bonded to boron (i.e., the substituents may replace from 1 to $m-1$ hydrogens), with hydroxylamine-O-sulfonic acid or an N-loweralkylhydroxylamine-O-sulfonic acid to give at least one product containing a $B_mH_m^=$ anion or a substituted derivative thereof, which anion contains at least one amino group or N-alkyl-substituted amino group bonded to boron.

The substituents on the substituted polyhedral borane starting compounds may replace from one up to all but one of the hydrogens in the B—H bonds of the polyhedral borane starting compound. In other words, when a substituted $B_{10}H_{10}^=$ derivative is the starting material, the substituents may replace nine of the hydrogens; while for the $B_{12}H_{12}^=$ derivatives, eleven of the hydrogens may be replaced.

The above-mentioned publication describes polyhedral $B_{10}$ and $B_{12}$ compounds containing typical substituents. The substituents may be considered as divided into a first and a second group. The first group can contribute at most only one substituent (i.e., none or one) to the substituted derivative; while the second group can contribute the remainder of the substituents, or all, if there are no substituents present from the first group. The first group is the Z component described immediately below and the second group is the X component described below.

Alternatively, the process can also be described as reacting a compound of the formula (1) $(M^{v+})_a[(B_mH_{m-n-p}X_nZ_p)^{(2-p)-}]_b$ or a hydrate thereof, where M is a cation of valence $v$, described in more detail below;
X is a monovalent group, also described in more detail below;
Z is an organic sulfide, a tertiary amine, or a tertiary phosphine, also described in more detail below;
$m$ is 10 or 12;
$p$ is 0 or 1;
$n$ is a cardinal whole number such that $n+p$ is at most $m-1$; and
$a$ and $b$ are the smallest positive whole numbers that satisfy the equation (2) $$a = \frac{(2-p)b}{v}$$

with a compound of the formula (3) $RR'NOSO_3H$ where R and R' are the same or different and are hydrogen or lower alkyl, i.e., up to 8 carbons, in solution at a pH between 5 and 8, to give at least one compound of the formula (4) $(M^{v+})_{2-p-q}([H_qB_mH_{m-n-p-q}X_nZ_p(NRR')_q]_2^{(2-p-q)-})_v$ where:

$p$ is 0 or 1,
$q$ is 1 or 2, and
the sum of $p$ and $q$ is at most 2, and the other terms are as described above.

In Formula 4, the portion of the molecule within the brackets can be considered an inner-salt structure, in which the acidic or protonic hydrogen or hydrogens designated by $H_q$ are neutralized by the basic amino group or groups, NRR'. Accordingly, an alternative formulation is:

(5) $(M^{v+})_{2-p-q}([B_mH_{m-n-p-q}X_nZ_p(NHRR')_q]^{(2-p-q)-})_v$

Since $p$ is either 0 or 1, the compounds of Formula 4 fall into two subgeneric classes, depending on whether or not a Z group is present. When $p$ is 1, $q$ must also be 1 and the compound can be represented by the formula (6) $HB_mH_{m-n-2}X_nZNRR'$ or alternatively, by the formula (7) $B_mH_{m-n-2}X_nZNHRR'$ The second class, that in which $p$ is 0, is represented by the formula (8) $(M^{v+})_{2-q}([H_qB_mH_{m-n-q}X_n(NRR')_q]^{2-q)-})_v$ or alternatively (9) $(M^{v+})_{2-q}([B_mH_{m-n-q}X_n(NHRR')_q]^{(2-q)-})_v$ The compounds of Formula 8 in turn fall into two lower subgeneric classes, depending on whether one or two amino groups, NRR', have been introduced. The first such subclass, that in which $q$ is 1, is represented by the formula

(10) $M^{v+}[(HB_mH_{m-n-1}X_nNRR')^-]_v$ or alternatively

(11) $M^{v+}[(B_mH_{m-n-1}X_nNHRR')^-]_v$

The second such subclass, that in which $q$ is 2, is represented by the formula

(12) $H_2B_mH_{m-n-2}X_n(NRR')_2$ or alternatively

(13) $B_mH_{m-n-2}X_n(NHRR')_2$

THE BORON-CONTAINING STARTING MATERIAL

The preparations of the boron-containing starting materials of Formula 1 are described in a later section. In these compounds, the cation M does not enter into the process reaction and therefore can be any cation that in combination with the $B_mH_{m-n-p}X_nZ_p$ anion gives a soluble salt. Such cations include ammonium and the metals of Groups I-A and II-A of the Periodic Table shown in Deming's "General Chemistry," Fifth edition, page 156 (Wiley, 1944). These metals are alkali metals and the alkaline-earth metals, respectively. Ammonium and metals of Group I–A of atomic number of at most 37 are preferred cations, ammonium, sodium, and potassium being especially preferred for economic reasons.

Except for the consideration of solubility mentioned above, the nature of the cation M is not a critical feature of the invention. The cation does not enter into the reaction that is the essential feature of the process, for said reaction involves only the $B_mH_{m-n-p}X_nZ_p$ anion and the anion of the hydroxylamine-O-sulfonic acid. This fact is shown by Equations 14 and 15, which depict the sequential introduction of two amino groups into a $B_{12}H_{12}$ anion.

(14) $B_{12}H_{12}^= + H_2NOSO_3^- \rightarrow HB_{12}H_{11}NH_2^-$
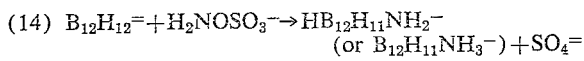(or $B_{12}H_{11}NH_3^-$) + $SO_4^=$

(15) $HB_{12}H_{11}NH_2^- + H_2NOSO_3^- \rightarrow H_2B_{12}H_{10}(NH_2)_2$
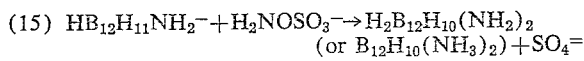(or $B_{12}H_{10}(NH_3)_2$) + $SO_4^=$ The product of the reaction of Equation 15, containing two amino groups, is an inner salt with an overall net charge of zero. The unsubstituted $B_{12}H_{12}$ anion and unsubstituted hydroxylamine-O-sulfonic acid are used in Equations 14 and 15 only for reasons of relative simplicity. The process is the same for anions containing X and/or Z substitutents and for alkyl-substituted hydroxylamine-O-sulfonic acids.

The group X in the starting material of Formula 1, which is the second group of substituents on the substituted polyborane anions mentioned previously, can be halogen, hydroxyl, saturated aliphatic hydrocarbyl (Q), aliphatically $$Q,\ OQ',\ SQ',\ \overset{O}{\overset{\|}{C}}Q'\ \text{or}\ \overset{O}{\overset{\|}{C}}OQ'$$

wherein Q is alkyl or cycloalkyl and Q' is alkyl, cycloalkyl, aryl, aralkyl, alkaryl or alkaralkyl.

Preferably, for reasons of availability, the hydrocarbon portions, Q and Q', of these groups contain at most 12 carbons each. Most preferably Q and Q' are lower alkyl. Examples of X groups are fluorine, chlorine, bromine, iodine, methyl, ethyl, 2-butyl, 3-hexyl, 2-decyl, cyclopentyl, cyclooctyl, cyclododecyl, methoxy, tert-butoxy, cyclohexyloxy, benzyloxy, α-naphthyloxy, m-ethylphenoxy, dodecyloxy, p-butylphenethoxy, isopropoxy, ethylthio, cyclobutylthio, hexylthio, phenylthio, p-tolylthio, 2-(β-naphthyl)ethylthio, tert-pentylthio, acetyl, pelargonyl, benzoyl, phenylacetyl, ethoxycarbonyl, butoxycarbonyl, 2-ethyl-1-hexyloxycarbonyl, and p-cresoxycarbonyl.

The group Z in the starting material of Formula 1, which is the first group of substituents on the substituted polyborane anions mentioned previously, can be $Q'_2S$, $Q_3N$ or $Q_3P$ where the Q and Q' groups in a given molecule can be the same or different and Q and Q' are as defined above, with the added proviso that any two Q or Q' groups can be joined together to form a ring of which the sulfur, nitrogen, or phosphorus is a member. The number of Z substituents is not more than 1. Examples of Z groups are diethyl sulfide, di(2-ethylhexyl) sulfide, butyl phenyl sulfide, di(p-tolyl) sulfide, tert-butyl dodecyl sulfide, cyclohexyl methyl sulfide, isopropyl m-tolylmethyl sulfide, tetramethylene sulfide, trimethylamine, triethylamine, trioctylamine, dicyclohexyl(methyl)amine, N-methylhexamethylenimine, N-hexylpiperidine, trimethylphosphine, triisobutylphosphine, triethylphosphine, dodecyldiethylphosphine, methyldioctylphosphine, and ethylisopropylisobutylphosphine. For reasons of availability, especially preferred Z groups are those in which all the Q and Q' groups in the molecule are the same and are lower alkyl. In $B_{12}$ compounds containing phosphines as Z groups, phosphines of at most six carbons are especially preferred.

As indicated in the definitions of terms following Formula 1, the number of X groups is limited only by the necessity of there being at least one hydrogen bonded to boron for substitution by an amino group. Because of the greater opportunities for substitution and therefore greater ease of reaction, compounds of Formula 1 containing a relatively large number of hydrogens bonded to boron, e.g., six or more, are especially preferred as starting materials.

Both because of availability and reactivity, a more preferred class of compounds of Formula 1, especially in the $B_{10}$ series ($m=10$), are those in which the total number of X and Z groups is at most one. Compounds containing no X or Z groups, i.e., starting materials of the formula

(16) $M_a(B_mH_m)_b$ where $a$ and $b$ are the smallest positive whole numbers that satisfy the equation

(17) 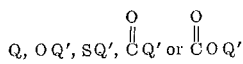$a = \dfrac{2b}{v}$ and M is as previously defined, are the most preferred because they are the most easily available.

THE PROCESS

The process of the invention is carried out in a mutual, inert solvent for the reactants. Water, lower alkanols, lower saturated aliphatic glycols and glycol alkyl ethers, and mixtures thereof are suitable solvents. Examples are ethyl, propyl, and isopropyl alcohols, ethylene glycol, diethylene glycol, 1,2-dimethoxyethane, 2-ethoxyethyl alcohol, and diethylene glycol monobutyl ether. Aqueous solvents, i.e., solvent systems containing appreciable amounts of water, are preferred because of their good solvent power. Water alone, or water containing minor amounts of organic solvents, is especially preferred for economic reasons.

The ratio of reactants is not critical and is determined largely by the stoichiometry of the desired reaction. When introduction of two amino groups is desired, a hydroxylamine-O-sulfonic acid/boron compound mole ratio of at least 2 and preferably higher is used. As the ratio is decreased from 2 to 1 and below, the relative amount of diaminated product decreases, and that of monoaminated product increases correspondingly. Little if any diaminated product can be isolated when the ratio is 1 or less.

As just described, it is possible to introduce a single amino group into a polyboron anion capable of being substituted by two amino groups (Equation 14). The monoaminated product thus obtained can be reacted farther with a hydroxylamine-O-sulfonic acid to introduce a second amino group (Equation 15). Accordingly, the process of the invention includes the reacting of such a monoaminated compound to produce a diaminated product. In this reaction, a hydroxylamine-O-sulfonic acid containing a different NRR' group from the NRR' group already in the starting material can be used, and diaminated products in which the NRR' groups are different can thus be prepared.

The process is conducted at a pH between 5 and 8. Preferably an essentially neutral solution, i.e., one having a pH of about 7, is used. Neutrality is conveniently realized by adding, to the solution of the boron compound to be aminated and the hydroxylamine-O-sulfonic acid, an amount of a solution of ammonium hydroxide or a soluble metal hydroxide or carbonate equivalent to the hydroxylamine-O-sulfonic acid. Alternatively, the hydroxylamine-O-sulfonic acid can be neutralized separately and the neutralized solution then combined with the boron compound. Preferably, and especially when the desired product is a monoaminated compound having the same cation as the cation, M, of the starting material of Formula 1, the hydroxide or carbonate is one containing the cation M. However, it is not necessary that the same cation be used; as stated previously, the essential reaction is one involving anions only. When the desired product is a diaminated compound or a monoaminated compound containing a Z group, the nature of the cation in the base used for neutralization is immaterial, since such products do not contain any cations, M.

The process can be conducted over a range of temperatures. Usually the temperature is between 5° C. and about 105° C., preferred temperatures being 60–100° C. The process is usually carried out at atmospheric pressure for reasons of convenience, although subatmospheric or superatmospheric pressure can be used. If a temperature above the boiling point of the reaction mixture is desired, it can be attained by using a closed system.

The time required will vary, depending mainly on the temperature and the boron compound to be aminated. It can be as short as a few minutes or as long as about 12 hours. Usually it is from 15 minutes to six hours under the preferred conditions.

The product is frequently relatively insoluble in the reaction medium and precipitates on cooling, after which it can be isolated by conventional procedures. Soluble, monoaminated products that contain the same cation, M, as that in the starting boron compound and in the base used for neutralization can be isolated simply by evaporation and solvent extraction or selective recrystallization. Alternatively, the anion of a soluble, monoaminated product can be isolated by adding a solution containing a cation that forms a sparingly insoluble salt with the anion. Soluble, aminated products that are electrically neutral or non-ionic, i.e., that contain no cation, can be isolated by evaporation and solvent extraction or selective recrystallization.

PROPERTIES OF THE PRODUCTS

The products of the process of this invention are crystalline solids that are stable to water and air. They are generally recrystallizable from solvents of the types used for the process. The diaminated products can be formed as mixtures of isomers, which can be separated by selective extraction or crystallization.

PREPARATION OF THE STARTING MATERIALS

Hydroxylamine-O-sulfonic acid is prepared from hydroxylammonium sulfate and fuming sulfuric acid, as described by Matsuguma and Audrieth in "Inorganic Syntheses," vol. V, page 122 (McGraw-Hill, 1957). N-alkyl and -dialkylhydroxylamine sulfonic acids can be made by substituting the corresponding substituted hydroxylammonium sulfates for hydroxylammonium sulfate.

Hydroxylamine-O-sulfonic acid itself (R and R' both= H in Formula 3) is the preferred aminating agent because of the relatively easy availability of hydroxylamine, the starting material for its preparation.

Compounds containing $B_{10}$ and $B_{12}$ anions are prepared as follows:

Ammonium decahydrodecaborate, $(NH_4)_2B_{10}H_{10}$, can be prepared in quantitative yield by the reaction of a decaboryl bis(lower dialkyl sulfide), e.g., decaboryl bis(dimethyl sulfide), $B_{10}H_{12}[(CH_3)_2S]_2$, with liquid ammonia at a temperature between about −50° C. and 0° C. The product is isolated simply by evaporating any excess, unreacted ammonia. This process is described in detail in United States 3,148,938. The decaboryl bis(lower dialkyl sulfide) is prepared by allowing decaborane, $B_{10}H_{14}$, to react with a lower dialkyl sulfide at a temperature of at least 0° C., and preferably at least 25° C., until approximately one mole of hydrogen per mole of decaborane is evolved. This process is described in detail in United States 3,154,561.

$(NH_4)_2B_{10}H_{10}$ can be converted to any corresponding alkali-metal or alkaline-earth-metal salt by passing its aqueous solution through a column packed with an acidic cation-exchange resin, neutralizing the solution of the acid $(H_3O)_2B_{10}H_{10}$ thus obtained with the hydroxide, oxide, or carbonate of the desired metal, and evaporating to dryness. This procedure and the substitution reactions discussed below are described in assignee's copending application Ser. No. 135,710, filed Aug. 2, 1961, in the name of W. H. Knoth, Jr., now abandoned and refiled on Nov. 13, 1962 as Ser. No. 237,392.

$B_{10}$ compounds containing X substituents (cf. Formula 1) are prepared by direct substitution reactions, in which hydrogens bonded to boron are replaced by X groups (cf. Knoth et al., J. Am. Chem. Soc., 84, 1056 (1962)).

For example, compounds of Formula 1 in which M is ammonium, alkali metal, or alkaline earth metal and in which X is halogen can be prepared by reacting a stoichiometric amount of the desired halogen with the appropriate $B_{10}H_{10}^=$ salt in water or methanol at 0–25° C. Fluorination is preferably carried out in water.

Hydroxyl groups (another value of X) can be introduced indirectly into the $B_{10}H_{10}^=$ anion by first reacting $(NH_4)_2B_{10}H_{10}$ with an amide such as dimethylformamide, dimethylacetamide, or N-methylpyrrolidone in the presence of hydrogen chloride at 80–180° C. The resulting borane-amide complex, containing one or more moles of amide per $B_{10}$ unit, is then treated with hot aqueous sodium hydroxide to give a substituted $B_{10}$ anion containing the same number of hydroxyl groups as there were amide molecules in the borane-amide complex.

Alkyl and cycloalkyl groups, Q, are introduced into the $B_{10}H_{10}^=$ anion by reacting the acid $(H_3O)_2B_{10}H_{10}$ (see above) with the corresponding olefins and cycloolefins at 50–100° C. The boron-containing acid is strong enough to catalyze this alkylation process in the absence of any other catalyst.

Hydrocarbyloxy groups, OQ', in which Q' is as defined previously, are introduced into the $B_{10}H_{10}^=$ anion by reacting the acid $(H_3O)_2B_{10}H_{10}$ with the corresponding methyl ethers, $CH_3OQ'$, at 30–80° C.

Hydrocarbylthio groups, SQ', in which Q' is as defined previously, are introduced into the $B_{10}H_{10}^=$ anion by reacting the acid $(H_3O)_2B_{10}H_{10}$ with the corresponding disulfides, Q'SSQ' at ordinary temperatures.

Hydrocarbylcarbonyl groups,

in which Q' is as defined previously, are introduced into the $B_{10}H_{10}^=$ anion by reacting the acid $(H_3O)_2B_{10}H_{10}$ with the corresponding acyl chlorides at ordinary temperatures or slightly below.

Hydrocarbyloxycarbonyl groups,

in which Q' is as defined previously, are introduced into the $B_{10}H_{10}^=$ anion by reacting the acid $(H_3O)_2B_{10}H_{10}$ with the acyl chloride phosgene

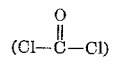

(cf. preceding paragraph) and then reacting the resulting anion with the appropriate hydroxyl compound, Q'OH. In the second step a chlorocarbonyl group,

substituted in the $B_{10}$ nucleus is transformed into the desired hydrocarbyloxycarbonyl group,

The substituted $B_{10}$ anions that are the products of the substitution reactions discussed in the foregoing paragraphs can be isolated from solution by precipitation with cations that give sparingly soluble salts, e.g., tetramethylammonium or trimethylsulfonium cations. The products thus obtained can be converted to the corresponding acids by passing their dilute aqueous solutions through acidic cation-exchange resins. The acids are converted to the ammonium, alkali-metal, and alkaline-earth-metal salts by neutralizing with the appropriate hydroxide, oxide, or carbonate and evaporation.

Any alkali-metal salt of the acid $(H_3O)_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a monohydrate, $Na_2B_{12}H_{12} \cdot H_2O$, which can absorb water from the atmosphere to form the dihydrate $Na_2B_{12}H_{12} \cdot 2H_2O$. The free acid $(H_3O)_2B_{12}H_{12}$ can be prepared by bringing an aqueous solution of any of its soluble salts into contact with an acidic cation-exchange resin. The process leads to an aqueous solution of the acid, which can be neutralized with metal hydroxides, oxides, or carbonates to give the corresponding metal salts. The latter precipitate as they are formed or can be isolated by evaporation. All these processes are described in detail in United States 3,169,045.

Halogen, hydroxyl, hydrocarbyl, hydrocarbyloxy, hydrocarbylthio, hydrocarbylcarbonyl, and hydrocarbyloxycarbonyl groups (all values of X in Formula 1) are introduced into the $B_{12}H_{12}^=$ anion by the same techniques that have been described in the preceding paragraphs for the $B_{10}H_{10}^=$ anion. These substitution reactions are described in assignee's copending application Ser. No. 141,248, filed Sept. 25, 1961 in the name of H. C. Miller and E. L. Muetterties, now abandoned and refiled as Ser. No. 246,636 on Dec. 21, 1962. (cf. also Knoth et al., J. Am. Chem. Soc. 84, 1056 (1962)).

Dihydrocarbyl sulfide, trihydrocarbylamine, and trihydrocarbylphosphine groups, represented by Z in Formula 1, are introduced into the $B_{10}H_{10}^=$ anion by reacting the corresponding sulfoxides, amine oxides, and phosphine oxides, $Z \rightarrow O$, with $(NH_4)_2B_{10}H_{10}$ at 25–100° C. in the presence of hydrogen chloride. Salts containing the $B_{10}H_9Z^-$ anion and any desired cation can be made by ion-exchange and metathetical reactions already described. These processes are described in assignee's copending application Ser. No. 123,082, filed June 30, 1961, in the name of W. H. Knoth, Jr., now abandoned and refiled as Ser. No. 251,697 on Jan. 15, 1962, and are illustrated by the preparation of $KB_{10}H_9S(CH_3)_2$ in Example 3 (below).

$B_{12}$ anions containing the Z groups of the preceding paragraph, i.e., $B_{12}H_{11}Z^-$ anions, are formed by reacting diborane with the appropriate dihydrocarbyl sulfides, trihydrocarbylamines, and trihydrocarbylphosphines at a temperature of at least 75° C. The primary products of these reactions containing the $B_{12}H_{11}Z^-$ anions can be converted by conventional cation-exchange and metathetical reactions to salts suitable for use in the process of the present invention. These preparations are described in assignee's copending applications Ser. No. 141,537, filed Sept. 28, 1961 in the name of N. E. Miller, and United States 3,265,737.

Starting materials of Formula 1 containing both Z groups and X groups can be prepared by first introducing the desired Z group by one of the methods of the two immediately preceding paragraphs and then reacting the product thus obtained to introduce the desired X group or groups as described above.

The following examples illustrate the process of this invention. All parts are by weight.

*Example 1*

A solution of 154 parts of $(NH_4)_2B_{10}H_{10}$ and 226 parts of $H_2NOSO_3H$ in 1500 parts of water was neutralized by adding, at 15–20° C., a solution of 80 parts of sodium hydroxide in 500 parts of water. The solution was heated at 95° C. for four hours and then was cooled to 4° C. $H_2B_{10}H_8(NH_2)_2$ (alternative formulation, $B_{10}H_8(NH_3)_2$) separated as a white, crystalline solid. It was isolated by filtration. Two additional crops of the same product were obtained successively by concentrating the solution, cooling, and isolating the product as described above. The second concentration was carried to the point where Glauber's salt precipitated, and the finely divided product was decanted from the large crystals of Glauber's salt. The combined products (24 parts) were recrystallized from water.

*Analysis.*—Calcd. for $B_{10}H_{14}N_2$: B, 72.0; H, 9.4; N, 18.7. Found: B, 72.0; H, 8.5; N, 18.3.

The mother liquor from the final crop of product described above contained a mixture of $NH_4(HB_{10}H_9NH_2)$ and $Na(HB_{10}H_9NH_2)$ in solution. On addition of a solution of 200 parts of tetramethylammonium chloride in 200 parts of water, 68 parts of $(CH_3)_4N(HB_{10}H_9NH_2)$ (alternative formulation, $(CH_3)_4N(B_{10}H_9NH_3)$) precipitated as a solid, which was separated by filtration and recrystallized from water.

*Analysis.*—Calcd. for $B_{10}C_4H_{24}N_2$: B, 51.9; N, 13.4. Found: B, 52.3; N, 13.3.

*Example 2*

A solution of 67 parts of $Na_2B_{12}H_{12} \cdot 2H_2O$ and 102 parts of $H_2NOSO_3H$ in 250 parts of water was neutralized by adding, below 25° C., a solution of 36 parts of sodium hydroxide in 100 parts of water. The solution was heated cautiously until an exothermic reaction began (at about 70° C.) and then cooled to moderate the reaction, which continued for about 30 minutes. The solution was cooled to 5° C., whereupon nine parts of $H_2B_{12}H_{10}(NH_2)_2$ (alternative formulation, $B_{12}H_{10}(NH_3)_2$) precipitated as a white, crystalline solid and was separated by filtration. On concentration of the filtrate to about half of its original volume, an additional seven parts of product precipitated and was separated as above. Two recrystallizations of the first fraction from water gave a very sparingly soluble, crystalline product.

*Analysis.*—Calcd. for $B_{12}H_{16}N_2$: B, 74.6; H, 9.3; N, 16.1. Found: B, 74.8; H, 9.2; N, 15.8.

Recrystallization of the second fraction from a relatively small amount of water gave a more soluble crystalline product.

*Analysis.*—Found: B, 74.6; H, 8.5; N, 15.3.

The two fractions isolated and purified as described above are apparently isomers of $H_2B_{12}H_{10}(NH_2)_2$, the first fraction described above containing about 25% of the less soluble isomer and the second fraction predominating in the more soluble isomer.

The corresponding monoamino compound,

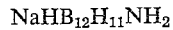
$NaHB_{12}H_{11}NH_2$ (alternative formulation, $NaB_{12}H_{11}NH_3$), can be obtained as the major product by using a lower

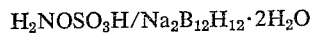
$H_2NOSO_3H/Na_2B_{12}H_{12} \cdot 2H_2O$ molar ratio, preferably a ratio of about 1.

*Example 3*

The starting material for this example,

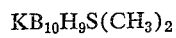
$KB_{10}H_9S(CH_3)_2$ was prepared as follows: Gaseous hydrogen chloride was passed for four minutes into a stirred mixture of 40 parts of $(NH_4)_2B_{10}H_{10}$ and 200 parts of dimethyl sulfoxide. The temperature was kept at 75° C. or below by external cooling. The mixture was poured into 500 parts of water, and the mixture was filtered to remove a small amount of insoluble material. Triethylamine (30 parts) was added to the filtrate, and the pH of the solution was brought to about 7 by addition of ammonium hydroxide. On standing, 36 parts of $(C_2H_5)_3NHB_{10}H_9S(CH_3)_2$ separated as a crystalline solid and was isolated by filtration. The product was added to an aqueous solution of an equivalent amount of potassium hydroxide, and the solution was boiled to expel triethylamine. On cooling, $$KB_{10}H_9S(CH_3)_2$$

crystallized from solution and was separated by filtration.

A solution of 11.3 parts of $H_2NOSO_3H$ in 40 parts of water was neutralized by adding a solution of 5.3 parts of anhydrous sodium carbonate in 20 parts of water. This solution was added to a solution of 15 parts of $KB_{10}H_9S(CH_3)_2$ in 100 parts of water. The mixture was heated at 95° C. for two hours and then was cooled to about 4° C. The semicrystalline mass that separated was isolated by filtration and recrystallized from a mixture of ethyl alcohol and propyl alcohol to give four parts of $HB_{10}H_8S(CH_3)_2NH_2$ (alternative formulation, $$B_{10}H_8S(CH_3)_2NH_3)$$

M.P. 290° C.

*Analysis.*—Calcd. for $B_{10}C_2H_{17}NS$: C, 12.3; H, 8.8; B, 55.4; N, 7.17; S, 16.4. Found: C, 12.4; H, 8.6; B, 54.9; N, 7.35; S, 16.6.

Additional examples of reactants that can be used to make aminated polyhedral boron compounds by the process of this invention, exemplified in the foregoing Examples 1, 2, and 3, are listed in Table I. In each instance the boron compound of Column 1 and the hydroxylamine-O-sulfonic acid of Column 2, neutralized with the base of Column 3, are reacted, preferably in aqueous solution at a temperature between 60° C. and 100° C., to give the product or products of Column 4. When both monoaminated and diaminated compounds are possible products, i.e., when either one or two amino groups, NRR', can be introduced, the major product is determined by the ratio of reactants, as discussed previously.

The products of the process of this invention are useful as components of high-energy fuels. They are also useful as combustible components of fireworks compositions to impart color and sparkle to the display. The products of the process of this invention are further useful as intermediates in preparing other boron-hydride compounds through reactions involving the amino groups. As shown by the following examples, they are also useful in the making of resistors from cellulosic materials.

*Example A*

A cotton string was soaked in a hot aqueous solution of $H_2B_{12}H_{10}(NH_2)_2$, and the solution was allowed to cool with the string in it. During cooling, crystals of the

TABLE I

| Column 1<br>Boron containing Reactant | Column 2<br>Hydroxylamine<br>O-sulfonic Acid | Column 3<br>Neutralizing<br>Agent | Column 4<br>Product or Products |
|---|---|---|---|
| $Na_2B_{12}H_6Cl_6$ | $H_2NOSO_3H$ | NaOH | $NaHB_{12}H_5Cl_6NH_2$<br>$H_2B_{12}H_4Cl_6(NH_2)_2$ |
| $CaB_{12}H_{11}I$ | $CH_3NHOSO_3H$ | $Ca(OH)_2$ | $Ca(HB_{12}H_{10}INHCH_3)_2$<br>$H_2B_{12}H_9I(NHCH_3)_2$ |
| $(NH_4)_2B_{12}H_{10}(C_2H_5)_2$ | $H_2NOSO_3H$ | $NH_4OH$ | $NH_4HB_{12}H_9(C_2H_5)_2NH_2$<br>$H_2B_{12}H_8(C_2H_5)_2(NH_2)_2$ |
| $K_2B_{12}H_{11}OH$ | $(CH_3)_2NOSO_3H$ | $K_2CO_3$ | $KHB_{12}H_{10}OHN(CH_3)_2$<br>$H_2B_{12}H_9OH[N(CH_3)_2]_2$ |
| $BaB_{12}H_{11}OCH_2CH_2C_6H_5$ | $C_4H_9NHOSO_3H$ | $Ba(OH)_2$ | $Ba[HB_{12}H_{10}(OCH_2CH_2C_6H_5)NHC_4H_9]_2$<br>$H_2B_{12}H_9(OCH_2CH_2C_6H_5)(NHC_4H_9)_2$ |
| $MgB_{12}H_{11}SC_4H_9$ | $C_2H_5NHOSO_3H$ | NaOH | $Mg(HB_{12}H_{10}SC_4H_9NHC_2H_5)_2$<br>$NaHB_{12}H_{10}SC_4H_9NHC_2H_5$<br>$H_2B_{12}H_9SC_4H_9(NHC_2H_5)_2$ |
| $Na_2B_{10}H_9SC_{12}H_{25}$ | $H_2NOSO_3H$ | $Na_2CO_3$ | $NaHB_{10}H_8SC_{12}H_{25}NH_2$<br>$H_2B_{10}H_7SC_{12}H_{25}(NH_2)_2$ |
| $(NH_4)_2B_{10}H_9Br$ | $C_6H_{13}NHOSO_3H$ | $NH_4OH$ | $NH_4HB_{10}H_8BrNHC_6H_{13}$<br>$H_2B_{10}H_7Br(NHC_6H_{13})_2$ |
| $K_2B_{10}H_9O(\alpha\ C_{10}H_7)$ | $H_2NOSO_3H$ | KOH | $KHB_{10}H_8O(\alpha\text{-}C_{10}H_7)NH_2$<br>$H_2B_{10}H_7O(\alpha\text{-}C_{10}H_7)(NH_2)_2$ |
| $SrB_{10}H_9F$ | $H_2NOSO_3H$ | $Sr(OH)_2$ | $Sr(HB_{10}H_8FNH_2)_2$<br>$H_2B_{10}H_7F(NH_2)_2$ |
| $NaB_{10}H_9S(C_6H_{11})_2$ ($C_6H_{11}$=cyclohexyl) | $C_3H_7NHOSO_3H$ | NaOH | $HB_{10}H_8S(C_6H_{11})_2NHC_3H_7$ |
| $LiB_{10}H_9P(CH_3)_3$ | $H_2NOSO_3H$ | NaOH | $NB_{10}H_8P(CH_3)_3NH_2$ |
| $NH_4B_{10}H_9N(C_2H_5)_3$ | $CH_2NHOSO_3H$ | $K_2CO_3$ | $HB_{10}H_8N(C_2H_5)_3NHCH_3$ |
| $CaB_{10}H_9C_8H_{17}$ | $H_2NOSO_3H$ | $Ca(OH)_2$ | $CaHB_{10}H_8(C_8H_{17})NH_2$<br>$H_2B_{10}H_7C_8H_{17}(NH_2)_2$ |
| $K_2B_{10}H_9OH$ | $H_2NOSO_3H$ | KOH | $KHB_{10}H_8OHNH_2$<br>$H_2B_{10}H_7OH(NH_2)_2$ |
| $Na_2B_{12}H_{11}C_{12}H_{23}$($C_{12}H_{23}$=cyclododecyl) | $H_2NOSO_3H$ | $Na_2CO_3$ | $NaHB_{12}H_{10}(C_{12}H_{23})NH_2$<br>$H_2B_{12}H_9(C_{12}H_{23})(NH_2)_2$ |
| $(NH_4)_2B_{12}H_{11}(p\text{-}OC_6H_4C_6H_{13})$ | $(C_2H_5)_2NOSO_3H$ | $NH_4OH$ | $NH_4HB_{12}H_{10}(p\text{-}OC_6H_4C_6H_{13})N(C_2H_5)_2$<br>$H_2B_{12}H_9(p\text{-}OC_6H_4C_6H_{13})[N(C_2H_5)_2]_2$ |
| $KB_{10}H_9P(C_4H_9)_3$ | $H_2NOSO_3H$ | KOH | $HB_{10}H_8P(C_4H_9)_3NH_2$ |
| 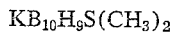 $NH_4B_{12}H_{11}S$——⟨ ⟩——$CH_3$ with $CH_3$ | $CH_3NHOSO_3H$ | $NH_4OH$ | $HB_{12}H_{10}\left[S\text{—}\langle\ \rangle\text{—}CH_3\right]NHCH_3$ with $CH_3$ |
|  $KB_{12}H_{11}CH_3N\begin{smallmatrix}CH_2CH_2\\ \\CH_2CH_2\end{smallmatrix}O$ | $H_2NOSO_3H$ | KOH | $HB_{12}H_{10}\left[CH_3N\begin{smallmatrix}CH_2CH_2\\ \\CH_2CH_2\end{smallmatrix}O\right]NH_2$ |
| $NaB_{12}H_{11}P(CH_3)_3$ | $(CH_3)_2NOSO_3H$ | $K_2CO_3$ | $HB_{12}H_{10}P(CH_3)_3N(CH_3)_2$ | product were deposited in and on the string. The string was removed and air-dried, and one end was ignited. The string burned to leave a black, self-supporting filament that retained the shape of the original string and could be handled without disintegration. The filament had a resistance of 20,000 ohms/cm. when measured between two mercury electrodes.

*Example B*

Example A was repeated with an acetone solution of $HB_{10}H_8S(CH_3)_2NH_2$ in place of the aqueous solution of $H_2B_{12}H_{10}(NH_2)_2$. A resistor similar to the product of Example A was obtained.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. Process for preparing polyhedral boron compounds having up to two substituents bonded to boron which are selected from the class consisting of amino and N-lower alkyl substituted amino, which comprises reacting
    (a) a polyhedral boron compound selected from the class consisting of
    $$(M^{v+})_a[B_mH_{m-n-p}X_nZ_p]^{(2-p)-}{}_b$$
    and hydrates thereof, wherein:
    M is a cation selected from the class consisting of ammonium, alkali metal and alkaline-earth metal;
    $v$ is the valence of M and is a number selected from the class consisting of 1 and 2;
    $m$ is a number selected from the class consisting of 10 and 12;
    X is a substituent bonded to boron by replacement of hydrogen and is selected from the class consisting of halogen, hydroxyl, Q, OQ', SQ',
    $$\overset{O}{\underset{\|}{C}}Q \text{ and } \overset{O}{\underset{\|}{C}}OQ'$$
    in which Q is of up to 12 carbon atoms and is selected from the class consisting of alkyl and cycloalkyl, and Q' is of up to 12 carbon atoms and is selected from the class consisting of alkyl, cycloalkyl, aryl, aralkyl, alkaryl and alkaralkyl;
    $n$ represents the number of X substituents bonded to boron and is a cardinal number of 0 to $m-1$, provided that $n+p$ is at most $m-1$;
    Z is a substituent bonded to boron by replacement of hydrogen and is selected from the class consisting of $Q'_2S$, $Q_3N$, $Q_3P$ wherein Q' and Q are defined as above, with the added proviso that any two Q and Q' groups in the same Z group can be joined together to form a ring with the heteroatom;
    $p$ represents the number of Z substituents and is a number selected from the class consisting of 0 and 1; and
    $a$ and $b$ are the smallest positive whole numbers which satisfy the equation
    $$a = \frac{(2-p)b}{v}$$
    with
    (b) a compound of the formula
    $$RR'NOSO_3H$$
    wherein R and R' are each of up to 8 carbon atoms selected from the class consisting of hydrogen and lower alkyl; at a pH of from about 5 to about 8 and a temperature of between about 25° C. and 105° C. in a mutual inert solvent for the reactants, to thereby produce a compound of the formula
    $$(M^{v+})_{2-p-q}([H_qB_mH_{m-n-p-q}X_mZ_p(NRR')_q]_2{}^{(2-p-q)-})_v$$
    where:
    $p$ is 0 or 1,
    $q$ is 1 or 2, and
    the sum of $p$ and $q$ is at most 2, and the other terms are as described above.

2. The process of claim 1 wherein $m$ is 12.
3. The process of claim 1 wherein $m$ is 10.
4. The process of claim 1 wherein $n$ and $p$ are each zero.
5. The process of claim 1 wherein Q and Q' are each lower alkyl.
6. The process of claim 1 wherein the sum of $(m-n-p)$ is at least 6.
7. The process of claim 1 wherein R and R' are each hydrogen.
8. The process of claim 1 wherein component (a) is $(NH_4)_2B_{10}H_{10}$ and component (b) is $H_2NOSO_3H$.
9. The process of claim 1 wherein component (a) is $Na_2B_{12}H_{12}$ and component (b) is $H_2NOSO_3H$.
10. The process of claim 1 wherein component (a) is $KB_{10}H_9S(CH_3)_2$ and component (b) is $H_2NOSO_3H$.

References Cited

Keller et al.: "Journal of The American Chemical Society," vol. 66, pp. 1122–1124 (1944).

Knoth et al.: "Journal of The American Chemical Society," vol. 84, pp. 1056–1057 (Mar. 20, 1962).

MILTON WEISSMAN, *Primary Examiner.*

PO-1050
(5/69)

UNITED STATES PATENT OFFICE
CERTIFICATE OF CORRECTION

Patent No. 3,365,282                    Dated January 23, 1968

Inventor(s)    Maynard S. Raasch

It is certified that error appears in the above-identified patent and that said Letters Patent are hereby corrected as shown below:

Column 3, lines 29 to 30, "saturated aliphatic hydrocarbyl (Q), aliphatically" should be deleted.

Table 1, 23rd formula in the right-hand column, that portion of the formula reading "$NB_{10}^-$" should be -- $HB_{10}^-$ --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents